(12) United States Patent
Yang et al.

(10) Patent No.: US 9,725,546 B2
(45) Date of Patent: Aug. 8, 2017

(54) MOISTURE-CURABLE COMPOSITION, METHOD OF USING, AND COMPOSITE ARTICLE

(71) Applicant: 3M INNOVATIVE PROPERTIES COMPANY, St. Paul, MN (US)

(72) Inventors: Yu Yang, Eden Prairie, MN (US); Suresh S. Iyer, Woodbury, MN (US); Miguel A. Guerra, Woodbury, MN (US); Kui Chen-Ho, Woodbury, MN (US); Daniel R. Vitcak, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/901,261

(22) PCT Filed: Jun. 6, 2014

(86) PCT No.: PCT/US2014/041269
§ 371 (c)(1),
(2) Date: Dec. 28, 2015

(87) PCT Pub. No.: WO2014/209574
PCT Pub. Date: Dec. 31, 2014

(65) Prior Publication Data
US 2016/0376391 A1    Dec. 29, 2016

Related U.S. Application Data

(60) Provisional application No. 61/839,122, filed on Jun. 25, 2013.

(51) Int. Cl.
*C08F 230/08* (2006.01)
*C08F 212/32* (2006.01)
(Continued)

(52) U.S. Cl.
CPC .......... *C08F 230/08* (2013.01); *C09D 143/04* (2013.01)

(58) Field of Classification Search
None
See application file for complete search history.

(56) References Cited

U.S. PATENT DOCUMENTS 2,637,738 A    5/1953    Wagner
3,114,778 A    12/1963   Fritz
(Continued)

FOREIGN PATENT DOCUMENTS

CN    1474837 A    2/2004
CN    1492010 A    4/2004
(Continued)

OTHER PUBLICATIONS

Machine translation of JP 2000-204319 A.*
(Continued)

*Primary Examiner* — Vu A Nuyen
(74) *Attorney, Agent, or Firm* — Bradford B. Wright

(57) ABSTRACT

A moisture-curable composition includes a polymer preparable by free-radical copolymerization of monomers comprising at least one monomer A and at least one monomer B. Monomer(s) A comprise free-radically polymerizable hydrolyzable silane. Monomer(s) B include a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF3)O)_e-$, and combinations thereof, wherein a, b, c, d, and e represent integers in the range of from 0 to 130, and wherein $1 \leq a+b+c+d+e \leq 130$. A composite article includes a layer of a composition on a substrate. The composition comprises a cross-linked (Continued)

reaction product of components including the moisture-curable composition. Methods of making the composite article are also disclosed.

14 Claims, 1 Drawing Sheet

(51) Int. Cl.
*C08F 214/18* (2006.01)
*C09D 143/04* (2006.01)

(56) References Cited

U.S. PATENT DOCUMENTS

| | | | |
|---|---|---|---|
| 3,322,826 A | | 5/1967 | Moore |
| 4,513,128 A | * | 4/1985 | Uschold ............ C08F 214/184 526/212 |
| 4,579,965 A | | 4/1986 | Kanner |
| 4,737,559 A | | 4/1988 | Kellen |
| 4,847,137 A | | 7/1989 | Kellen |
| 4,886,862 A | * | 12/1989 | Kuwamura ......... C09D 157/08 525/326.2 |
| 4,966,812 A | | 10/1990 | Ashley |
| 5,041,595 A | | 8/1991 | Yang |
| 5,637,646 A | | 6/1997 | Ellis |
| 6,204,350 B1 | | 3/2001 | Liu |
| 6,255,536 B1 | | 7/2001 | Worm |
| 6,977,307 B2 | | 12/2005 | Dams |
| 8,138,274 B2 | | 3/2012 | Hung |
| 8,268,067 B2 | | 9/2012 | Iyer |
| 8,329,830 B2 | | 12/2012 | Yang |
| 2004/0077775 A1 | | 4/2004 | Audenaert |

FOREIGN PATENT DOCUMENTS

| | | |
|---|---|---|
| CN | 102206299 A | 10/2011 |
| EP | 0130052 | 1/1985 |
| JP | S60-23407 A | 2/1985 |
| JP | 8-134143 | 5/1996 |
| JP | 8-143820 | 6/1996 |
| JP | 8-311367 | 11/1996 |
| JP | 9-194789 | 7/1997 |
| JP | 2000-204319 | 7/2000 |
| JP | 2001-40211 | 2/2001 |
| RU | 788681 | 4/1996 |
| WO | WO 98/28307 | 7/1998 |
| WO | WO 2007/146509 | 12/2007 |
| WO | WO 2011/002666 | 1/2011 |

OTHER PUBLICATIONS

Chen, "Anti-reflection (AR) coatings made by sol-gel processes: A review", Solar Energy Materials and Solar Cells, Jun. 2001, vol. 68, No. 3-4, pp. 313-336.
Fabbri, "Hydrophobic and Oleophobic Coatings Based on Perfluoropolyether/Silica Hybrids by the Sol-Gel Method", Advances in Polymer Technology, 2007, vol. 26, No. 3, pp. 182-190.
Fabbri, "Perfluoropolyether-based organic-inorganic hybrid coatings", Polymer, 2006, vol. 47, pp. 1055-1062.
Fabbri, "Surface Properties of Fluorinated Hybrid Coatings", J. of Appl. Polymer Science, 2006, vol. 102, pp. 1483-1488.
Goto, "Creation of Coating surfaces possessing superhydrophobic and superoleophobic characteristics with fluoroalkyl end-capped vinyltrimethoxysilane oligomeric nanocomposites having biphenylene segments", Journal of Colloid and Interface Science, 2011, vol. 362, pp. 375-381.
Gunji, Preparation and properties of organic-inorganic hybrid gel films based on polyvinylpolysilsesquioxane synthesized from trimethoxy(vinyl)silane, Applied organometallic chemistry, 2003, vol. 17, pp. 580-588.
Sawada, "Synthesis and Surface Properties of Novel Amphiphilic Fluorosilicone Oligomers", J. Jpn. Oil Chem. Soc., 1994, vol. 43, No. 1, pp. 65-67.
Sawada, "Synthesis of Hydrophilic Fluorosilane Coupling Oligomers Possessing Anti-Human Immunodeficiency Virus Type-1 Activity", J. Jpn. Oil Chem. Soc., 1997, vol. 46, No. 4, pp. 435-438.
Zhang, "Sol-Gel Preparation of PDMS/Silica Hybrid Antireflective Coatings with Controlled Thickness and Durable Antireflective Performance", J. Phys. Chem. C, 2010, vol. 114, No. 47, pp. 19979-19983.
International Search Report for PCT International Application No. PCT/US2014/041269, mailed on Oct. 20, 2014, 3 pages.

\* cited by examiner

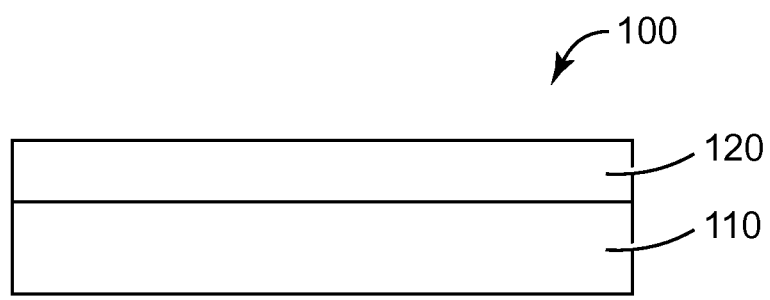

MOISTURE-CURABLE COMPOSITION, METHOD OF USING, AND COMPOSITE ARTICLE

TECHNICAL FIELD

The present disclosure broadly relates to moisture-curable compositions that may be used for protective coatings.

BACKGROUND

Over the years, various protective coatings have been developed that provide resistance to mechanical damage, corrosion, marine organisms, and/or graffiti. Often these coatings are based on silicone and/or organofluorine chemistry.

Many protective coatings have a high concentration of fluorine in order to achieve a desired level of moisture, chemical, and/or graffiti resistance. However, such compositions typically sacrifice hardness and durability in their quest for repellency. There remains a need for new materials that can be used to make protective coatings on substrates.

SUMMARY

In one aspect, the present disclosure provides a moisture-curable composition comprising a polymer preparable by free-radical copolymerization of monomers comprising at least one monomer A and at least one monomer B, wherein:

each monomer A is independently represented by the formula

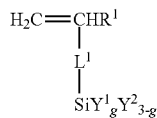

wherein
  $R^1$ represents H or methyl,
  $L^1$ is a covalent bond or a divalent aliphatic group having from 1 to 10 carbon atoms,
  each $Y^1$ independently represents a hydrocarbyl group having from 1 to 6 carbon atoms,
  each $Y^2$ independently represents a hydrolyzable group, and
  g is 0, 1, or 2; and
each monomer B is independently represented by the formula

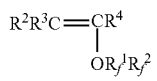

wherein
  $R^2$, $R^3$, and $R^4$ represent H, methyl, trifluoromethyl, or F, wherein at least one of $R^2$, $R^3$, and $R^4$ is F,
  $R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $1 \leq a+b+c+d+e \leq 130$,
  $R_f^2$ is a perfluoroalkyl group, and
further wherein the polymer contains less than or equal to 0.49 percent by weight of fluorinated alkene.

In another aspect, the present disclosure provides a moisture-curable composition comprising a polymer preparable by free-radical copolymerization of monomers comprising at least one monomer A and at least one monomer B, wherein:

each monomer A is independently represented by the formula

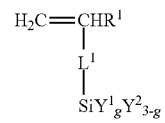

wherein
  $R^1$ represents H or methyl,
  $L^1$ is a covalent bond or a divalent aliphatic group having from 1 to 10 carbon atoms,
  each $Y^1$ independently represents a hydrocarbyl group having from 1 to 6 carbon atoms,
  each $Y^2$ independently represents a hydrolyzable group, and
  g is 0, 1, or 2; and
each monomer B is independently represented by the formula

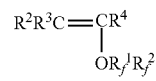

wherein
  $R^2$, $R^3$, and $R^4$ represent H, methyl, trifluoromethyl, or F, wherein at least one of $R^2$, $R^3$, and $R^4$ is F,
  $R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $2 \leq a+b+c+d+e \leq 130$, and
  $R_f^2$ is a perfluoroalkyl group.

Moisture-curable compositions according to the present disclosure are useful, for example, for coating substrates to make composite articles. Accordingly, in another aspect, the present disclosure provides a method of making a composite article, the method comprising: disposing a layer of a moisture-curable composition according to the present disclosure on a substrate, and at least partially curing the moisture-curable composition.

In yet another aspect, the present disclosure provides a composite article comprising a composition disposed on a substrate, wherein the composition comprises a cross-linked reaction product of components comprising a moisture-curable composition according to the present disclosure.

Advantageously, moisture-curable compositions according to the present disclosure are useful, for example, for easily making protective coatings on substrates. Because of the incorporation of fluorinated segments, the protective coatings have low-surface-energy properties such as excellent water, oil, and stain repellency, as well as durability and good adhesion to a wide variety of substrates. Conventional organofluorine-based protective coatings may require additional expensive primers to improve the adhesion of the protective coating to the substrate. In contrast, moisture curable compositions according to the present disclosure can be effectively used without a primer on a variety of substrates.

As used herein, the term "aliphatic" refers to any organic group or molecule that does not contain an aromatic moiety;

the term "alkene" refers to an ethylenically-unsaturated compound consisting of carbon and hydrogen atoms; and the term "fluorinated alkene" refers to an alkene wherein one or more hydrogen atoms have been replaced by fluorine atom(s).

the prefix "(meth)acryl" means "acryl" and/or "methacryl".

BRIEF DESCRIPTION OF THE DRAWING

FIG. 1 is a schematic side view of exemplary composite article 100 according to the present disclosure.

It should be understood that numerous other modifications and embodiments can be devised by those skilled in the art, which fall within the scope and spirit of the principles of the disclosure. The FIGURE may not be drawn to scale.

DETAILED DESCRIPTION

Moisture-curable compositions according to the present disclosure include a polymer that is preparable by (in some embodiments prepared by free-radical copolymerization of monomers comprising at least one monomer A (i.e., monomer(s) A) and at least one monomer B (i.e., monomer(s) B).

Monomer(s) A are independently represented by the formula

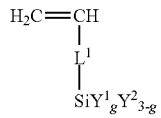

$L^1$ represents a covalent bond (i.e., between the carbon and silicon atoms) or a divalent aliphatic group having from 1 to 10 carbon atoms. Examples of suitable divalent aliphatic groups include: divalent alkylene groups (e.g., methylene, ethylene, 1,2-propylene, 1,3-propylene, 1,4-butylene, 1,6-hexylene, 1,8-octylene, 1,9-nonylene, and 1,10-decylene); and —C(=O)O(CH$_2$)$_v$— wherein v represents 2, 3, 4, or 5; —O(CH$_2$)$_p$— wherein p represents 2, 3, 4, 5, or 6. In some embodiments, $L^1$ is preferably a covalent bond.

Each $Y^1$ independently represents a hydrocarbyl group (generally non-hydrolyzable) having from 1 to 6 carbon atoms. Examples of $Y^1$ include methyl, ethyl, propyl, isobutyl, pentyl, cyclohexyl, and phenyl.

Each $Y^2$ independently represents a hydrolyzable group. The term "hydrolyzable group" in connection with the present invention refers to a group which either is directly capable of undergoing condensation reactions under typical condensation reaction conditions, or which is capable of hydrolyzing under these conditions, thereby yielding a compound, which is capable of undergoing condensation reactions. Examples of hydrolyzable groups include halo groups (e.g., chloro, bromo, iodo), alkoxy groups (e.g., alkoxy groups having from 1 to 4 carbon atoms, preferably 1 or 2 carbon atoms), aryloxy groups (e.g., phenoxy groups), hydroxyl, and alkanoyloxy groups having from 2 to 4 carbon atoms (e.g., acetoxy, propanoyloxy, butanoyloxy). Typical condensation reaction conditions include acidic or basic conditions.

g is 0, 1, or 2, preferably 0.

Many such monomers are known. For example, suitable ethylenically unsaturated hydrolyzable silanes and methods of making them are described in WO 98/28307 A1 (Ceska et al.). Likewise, many suitable such monomers are commercially available. Examples of suitable commercially available free-radically polymerizable hydrolyzable silanes include: allyltrichlorosilane; allyltriethoxysilane; allyltrimethoxysilane; vinyltri-t-butoxysilane; vinyltriacetoxysilane; vinyltrichlorosilane; vinyltriethoxysilane; vinyltriisopropenoxysilane; vinyltriisopropoxysilane; vinyltrimethoxysilane; vinyltriphenoxysilane; vinyltris(1-methoxy-2-propoxy)silane; and vinyltris(2-methoxyethoxy) silane, all of which are available from Gelest, Inc., Morrisville, Pa. Other suitable monomers include vinyldimethylmethoxysilane, vinyldimethylethoxysilane, vinylmethyldimethoxysilane, vinylmethyldiethoxysilane, vinylethyldiethoxysilane.

Vinyl alkoxysilanes may be prepared by catalyzed hydrosilylation reactions of alkoxysilanes and acetylene. Another approach involves reaction of vinylchlorosilane with an alcohol. Methods of preparation are described in U.S. Pat. No. 2,637,738 (Wagner); U.S. Pat. No. 4,579,965 (Kenner et al.); and U.S. Pat. No. 5,041,595 (Yang et al.). Vinyl alkoxysilanes are also commercially available, for example from Sigma-Aldrich Co. and Gelest Inc.

Monomer(s) B are independently represented by the formula

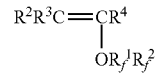

$R^2$, $R^3$, and $R^4$ represent H, methyl, trifluoromethyl, or F, with the proviso that at least one of $R^2$, $R^2$, and $R^3$ is F. In some embodiments, at least two of $R^2$, $R^3$, and $R^4$ are F. In some embodiments, $R^2$ and $R^3$ are F, and $R^4$ is F or trifluoromethyl.

$R_f^1$ represents a covalent bond or a divalent group selected from the group consisting of —(CF$_2$O)$_a$—, —(CF$_2$CF$_2$O)$_b$—, —(CF$_2$CF$_2$O)$_c$—, —(CF$_2$CF$_2$CF$_2$O)$_d$—, —(CF$_2$CF(CF$_3$)O)$_e$—, and combinations thereof, wherein a, b, c, d, and e represent integers in the range of from 0 to 130.

In some embodiments, 1≤a+b+c+d+e≤130. In some embodiments, 2≤a+b+c+d+e≤130. In some embodiments, at least one of a, b, c, d, or e represents an integer in the range of from 1 or 2 to 130, preferably 1 or 2 to 80, more preferably for 1 or 2 to 50, and more preferably 1 or 2 to 40. In some embodiments, at least one of a, b, c, d, or e represents an integer in the range of from 1 or 2 to 10, preferably 1 or 2 to 5. In some embodiments, 1≤a+b+c+d+e≤50. In some embodiments, 2≤a+b+c+d+e≤50. In some embodiments, 10≤a+b+c+d+e≤130. In some embodiments, 10≤a+b+c+d+e≤50. In some embodiments, 30≤a+b+c+d+e≤60. In some embodiments, 4≤a+b+c+d+e≤130, preferably 4≤a+b+c+d+e≤80, more preferably 4≤a+b+c+d+e≤50, more preferably 4≤a+b+c+d+e≤40, and even more preferably 4≤a+b+c+d+e≤40.

Some examples of $R_f^1$ include —(CF$_2$O)$_{20-30}$, —(CF$_2$CF$_2$O)$_{30-40}$—, —(CF$_2$CF$_2$O)$_{40-50}$—, —(CF$_2$CF$_2$CF$_2$O)$_{20-30}$, —(CF$_2$CF(CF$_3$)O)$_{4-8}$—, —(CF$_2$CF(CF$_3$)O)$_{30-40}$—, —(CF$_2$CF$_2$O)$_{30-40}$(CF$_2$CF(CF$_3$)

$O)_{30-40}$—, and —$(CF_2O)_{20-30}(CF_2CF_2O)_{85-100}$—. When present in combination, the units —$(CF_2O)$—, —$(CF_2CF_2O)$—, —$(CF_2CF_2O)$—, —$(CF_2CF_2CF_2CF_2O)$—, and —$(CF_2CF(CF_3)O)$—, may be present in a random or pseudorandom order and/or in blocks.

$R_f^2$ is a perfluoroalkyl group. Preferably, $R_f^2$ has from 1 to 6 carbon atoms. Examples of suitable perfluoroalkyl groups include trifluoromethyl, pentafluoroethyl, nonafluorobutyl, nonafluoroisobutyl, perfluoropentyl, and perfluorohexyl.

Suitable fluorinated vinyl ethers can be prepared, for example, according to methods well known in the art; for example, as described in U.S. Pat. No. 6,255,536 B1 (Worm et al.).

In some embodiments, the average molar ratio of monomer(s) A to monomer(s) B is at least 1 (e.g., at least 10, at least 40, at least 80, at least 100, at least 125, or even at least 150). In some embodiments, the weight ratio of monomer(s) B to monomer(s) A is at least 0.8 (e.g., at least 5, at least 10, at least 20, at least 25, or even at least 30).

Monomers A and B may be combined with one or more additional free-radically polymerizable monomers prior to polymerization. If present, such additional monomers are preferably present in an individual or combined amount of less than 20 percent by weight, more preferably less than 10 percent by weight, more preferably less than 2 percent by weight, based on the total weight of the monomers present. For example, in some preferred embodiments, the monomers further comprise at least one monomer C independently represented by the formula

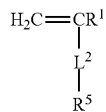

wherein $R^1$ is as previously defined, $L^2$ represents a covalent bond or divalent aliphatic group having from 1 to 6 carbon atoms, and $R^5$ represents a reactive group selected from the group consisting of a carboxyl group, a sulfo group, a phosphono group, a cyano group, an isocyanato group, carboxamido groups, photocrosslinking groups, formamido groups, and epoxy groups.

Exemplary groups $L^2$ include: divalent alkylene groups (e.g., methylene, ethylene, 1,2-propylene, 1,3-propylene, 1,4-butylene, and 1,6-hexylene); —$C(=O)O(CH_2)_f$— wherein f represents 1, 2, 3, 4, or 5; —$O(CH_2)_j$— wherein j represents an integer in the range of from 1 to 12; —$C(=O)O(CH_2)_qNHC(=O)$—, wherein q is an integer in the range of from 1 to 4. In some embodiments, $L^2$ is preferably a covalent bond.

In some embodiments, $R^5$ is selected from the group consisting of a carboxyl group, a sulfo group (i.e., —$SO_3H$), formamido groups (i.e., —$HNC(=O)H$ or an N-alkyl substituted derivative thereof), and a phosphono group (i.e., —$PO_3H$). In some embodiments, $R^5$ comprises a photocrosslinking group containing a benzophenone or substituted benzophenone moiety. Examples include those represented by the formula

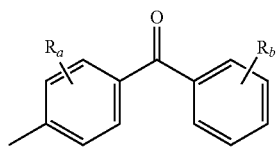

wherein $R_a$ and $R_b$ represent alkyl, amino, alkylamino, dialkylamino, alkoxy, cyano, chloro, bromo, or hydroxyl. If exposed to actinic radiation (preferably electromagnetic radiation in the wavelength range of from 300 to 360 nm), the carbonyl group become excited and abstracts an available hydrogen atom creating a free radical pair. If two free radicals generated in this manner are located on separate polymer macromolecules, then formation of a covalent bond may occur between the polymer macromolecules resulting in the formation of a crosslink, which may tend to increase abrasion and/or chemical resistance.

Examples of free-radically polymerizable monomers containing photocrosslinking group containing a photocrosslinkable group include those disclosed in U.S. Pat. No. 4,737,559 (Kellen et al.). Specific examples include p-acryloxybenzophenone, p-acryloxyethoxybenzophenone, p-N-(methylacryloxyethyl)carbamoylethoxybenzophenone, p-acryloxyacetophenone, o-acrylamidoacetophenone, and acrylated anthraquinones.

As discussed above, one or more additional free-radically polymerizable monomers may also be included in the polymerizable components (e.g., to modify repellency and/or hardness properties), and hence incorporated into the resulting polymer. Examples of such monomers include alkyl (meth)acrylates having from 4 to 22 carbon atoms (e.g., butyl acrylate, isobornyl acrylate), alkoxyalkyl methacrylates having from 4 to 22 carbon atoms, epoxy acrylates having from 6 to 22 carbon atoms (e.g., glycidyl methacrylate), isocyanatoalkyl (meth)acrylates having from 6 to 22 carbon atoms (e.g., 3-isocyanatopropyl (meth)acrylate)), and combinations thereof.

In some embodiments, the combined total all of the free-radically polymerizable monomers, contains less than or equal to 0.49 percent by weight (preferably less than 0.3 percent by weight, more preferably less than 0.1 percent by weight) of fluorinated alkene. In some embodiments, the combined total all of the free-radically polymerizable monomers are free of fluorinated alkene.

Preferably, the additional monomers do not contain multiple free-radically polymerizable groups that would cause crosslinking, although very small amounts of crosslinking resulting in a syrup, for example, are acceptable.

The monomers can be combined and copolymerized to form the polymer by free-radical polymerization in the presence of a free-radical polymerization thermal initiator. Techniques for free-radical polymerization of ethylenically unsaturated monomers are well known in the art and described in, for example, U.S. Pat. No. 5,637,646 (Ellis).

Polymerization can be carried out in any solvent suitable for organic free-radical reactions. The reactants can be present in the solvent at any suitable concentration, e.g., from about 5 percent to about 90 percent by weight based on the total weight of the reaction mixture. Illustrative examples of suitable solvents The oligomerization reaction can be carried out at any temperature suitable for conducting an organic free-radical reaction. Particular temperature and solvents for use can be easily selected by those skilled in the art based on considerations such as the solubility of reagents, the temperature required for the use of a particular initiator, molecular weight desired and the like. While it is not practical to enumerate a particular temperature suitable for all initiators and all solvents, generally suitable temperatures are between about 30° C. and about 200° C., although other temperatures may also be used.

Thermal initiators for free-radical polymerization are generally used in effective amounts (e.g., from about 0.01 to 5 percent by weight). Useful thermal initiators include, for example, azo and peroxide initiators. Examples of suitable azo initiators include 2,2'-azobis(2,4-dimethylvaleronitrile); 2,2'-azobis(isobutyronitrile); 2,2'-azobis-2-methylbutyronitrile; and (1,1'-azobis(1-cyclohexanecarbonitrile); 2,2'-azobis(methyl isobutyrate); 2,2'-azobis(2-amidinopropane) dihydrochloride; and 2,2'-azobis(4-methoxy-2,4-dimethylvaleronitrile). Examples of suitable peroxide initiators include benzoyl peroxide, acetyl peroxide, lauroyl peroxide, decanoyl peroxide, dicetyl peroxydicarbonate, di(4-t-butylcyclohexyl) peroxydicarbonate, di(2-ethylhexyl) peroxydicarbonate, t-butyl peroxypivalate, t-butyl peroxy-2-ethylhexanoate, and dicurnyl peroxide.

The resulting polymer is typically a random or pseudo-random copolymer including the monomers present during polymerization, although this is not a requirement. The resultant polymer typically has a number and/or weight average molecular weight of at least 10000 g/mol, at least 20000 g/mol, at least 50000 g/mol, at least 150000 g/mol, and/or even at least 200000 g/mol, although this is not a requirement. In order to achieve high molecular weights, the polymerization is preferably carried out without added chain transfer agents (e.g., mercaptans).

Various other additives may optionally be included in the moisture curable composition. Examples of optional additives include fragrances, pigments, dyes, antioxidants, ultraviolet light (UV) stabilizers, thickeners, fillers, hydrolyzable silanes (e.g., epoxysilanes, tetraalkyl orthosilicates having from 4 to 16 carbon atoms), and thixotropes. Moisture-curable compositions according to the present disclosure are useful for making composite articles (e.g., a substrate having a hardcoat on at least a portion of a surface thereof). The composite articles can be made by disposing a layer of the moisture-curable composition on a substrate, and at least partially curing the moisture-curable composition.

Referring now to FIG. 1, exemplary composite article 100 includes substrate 110 with layer 120 of a composition, wherein the composition comprises a cross-linked reaction product of components comprising the moisture-curable composition according to the present disclosure.

Coating can be accomplished by any suitable method including, for example, spray coating, dip coating, roll coating, gravure coating, knife coating, curtain coating, sponge coating, and wipe coating.

To facilitate coating and/or handling of the moisture curable composition, it may be diluted with solvent; for example, to achieve a desired solids content and/or viscosity. Examples of suitable solvents include: aliphatic hydrocarbons (e.g., hexane, heptane, cyclohexane); aromatic solvents (e.g., benzene, toluene, xylene); ethers (e.g., diethyl ether, glyme, diglyme, diisopropyl ether); esters (e.g., ethyl acetate, butyl acetate); alcohols (e.g., ethanol, isopropyl alcohol); ketones (e.g., acetone, methyl ethyl ketone, methyl isobutyl ketone); sulfoxides (e.g., dimethyl sulfoxide); amides (e.g., N,N-dimethylformamide, N,N-dimethylacetamide); halogenated solvents (e.g., ethylchloroform, dichloroethylene, trifluorotoluene); and combinations thereof.

Curing (e.g., at least partial curing) of the moisture-curable composition generally occurs by hydrolysis and condensation of the moisture-curable composition, and typically occurs spontaneously upon standing and/or solvent evaporation of the coating in air (e.g., air containing water vapor) to form a crosslinked (e.g., through Si—O—Si linkages) reaction product. Heat and/or steam (e.g., superheated steam) may be used to accelerate and/or advance curing of the moisture-curable composition.

The resultant cured composition (in some embodiments, termed a "hardcoat") typically has good mechanical durability (e.g., hardness and/or abrasion resistance), adhesion, and repellency properties. The thickness of the hardcoat may be, for example, from 10 nanometers to 1 millimeter (mm) or more. More typically, the hardcoat has a thickness of from 0.01 mm to 0.3 mm.

Suitable substrates on which the moisture curable composition (and resultant cured composition) may be disposed include, for example, aluminum, stainless steel, glass, copper, silver, kitchen tile, restroom fixtures, plastic film, molded plastic parts, painted and/or clearcoated automotive body panels, marine surfaces (e.g., hulls and trim), motorcycle parts, and cover glasses for electronic displays,

SELECT EMBODIMENTS OF THE PRESENT DISCLOSURE

In a first embodiment, the present disclosure provides a moisture-curable composition comprising a polymer preparable by free-radical copolymerization of monomers comprising at least one monomer A and at least one monomer B, wherein:

each monomer A is independently represented by the formula

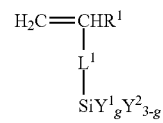

wherein
$R^1$ represents H or methyl,
$L^1$ is a covalent bond or a divalent aliphatic group having from 1 to 10 carbon atoms,
each $Y^1$ independently represents a hydrocarbyl group having from 1 to 6 carbon atoms,
each $Y^2$ independently represents a hydrolyzable group, and
g is 0, 1, or 2; and
each monomer B is independently represented by the formula

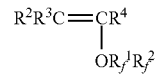

wherein
$R^2$, $R^3$, and $R^4$ represent H, methyl, trifluoromethyl, or F, wherein at least one of $R^2$, $R^3$, and $R^4$ is F,
$R_f^1$ represents a covalent bond or a divalent group selected from the group consisting of —(CF$_2$O)$_a$—, —(CF$_2$CF$_2$O)$_b$—, —(CF$_2$CF$_2$CF$_2$O)$_c$—, —(CF$_2$CF$_2$CF$_2$CF$_2$O)$_d$—, —(CF$_2$CF(CF$_3$)O)$_e$—, and combinations thereof, wherein a, b, c, d, and e represent integers in the range of from 0 to 130, and wherein 1≤a+b+c+d+e≤130,
$R_f^2$ is a perfluoroalkyl group, and
further wherein the polymer contains less than or equal to 0.49 percent by weight of fluorinated alkene.

In a second embodiment, the present disclosure provides a moisture-curable composition comprising a polymer preparable by free-radical copolymerization of monomers comprising at least one monomer A and at least one monomer B, wherein:

each monomer A is independently represented by the formula

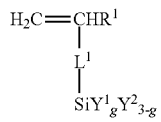

wherein
$R^1$ represents H or methyl,
$L^1$ is a covalent bond or a divalent aliphatic group having from 1 to 10 carbon atoms,
each $Y^1$ independently represents a hydrocarbyl group having from 1 to 6 carbon atoms,
each $Y^2$ independently represents a hydrolyzable group, and
g is 0, 1, or 2; and
each monomer B is independently represented by the formula

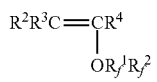

wherein
$R^2$, $R^3$, and $R^4$ represent H, methyl, trifluoromethyl, or F, wherein at least one of $R^2$, $R^3$, and $R^4$ is F,
$R_f^1$ represents a covalent bond or a divalent group selected from the group consisting of —$(CF_2O)_a$—, —$(CF_2CF_2O)_b$—, —$(CF_2CF_2CF_2O)_c$—, —$(CF_2CF_2CF_2CF_2O)_d$—, —$(CF_2CF(CF_3)O)_e$—, and combinations thereof, wherein a, b, c, d, and e represent integers in the range of from 0 to 130, and wherein $2 \leq a+b+c+d+e \leq 130$, and
$R_f^2$ is a perfluoroalkyl group.

In a third embodiment, the present disclosure provides a moisture-curable composition according to the first or second embodiment, wherein the weight ratio of said at least one monomeric unit B to said at least one monomeric unit A is at least 0.8.

In a fourth embodiment, the present disclosure provides a moisture-curable composition according to any one of the first to third embodiments, wherein $L^1$ is a covalent bond.

In a fifth embodiment, the present disclosure provides a moisture-curable composition according to any one of the first to fourth embodiments, wherein $Y^2$ is selected from the group consisting of alkoxy groups having from 1 to 4 carbon atoms, alkanoyloxy groups having from 2 to 4 carbon atoms, a hydroxyl group, and Cl.

In a sixth embodiment, the present disclosure provides a moisture-curable composition according to any one of the first to fifth embodiments, wherein the average molar ratio of said at least one monomer A to said at least one monomer B is at least 1.

In a seventh embodiment, the present disclosure provides a moisture-curable composition according to any one of the first to sixth embodiments, wherein $R^2$, $R^3$, and $R^4$ represent F.

In an eighth embodiment, the present disclosure provides a moisture-curable composition according to any one of the first to seventh embodiments, wherein said at least one monomer B has an average sum of a+b+c+d+e in the range of from 30 to 40.

In a ninth embodiment, the present disclosure provides a moisture-curable composition according to any one of the first to eighth embodiments, wherein said at least one monomer B has an average sum of a+b+c+d+e in the range of from 4 to 8.

In a tenth embodiment, the present disclosure provides a moisture-curable composition according to any one of the first to ninth embodiments, wherein the monomers further comprise at least one monomer C independently represented by the formula

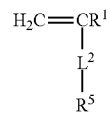

wherein
$L^2$ represents a covalent bond or divalent aliphatic group comprising from 1 to 6 carbon atoms, and
$R^5$ represents a reactive group selected from the group consisting of a carboxyl group, a sulfo group, a phosphono group, a cyano group, an isocyanato group, carboxamido groups, photocrosslinking groups, formamido groups, and epoxy groups.

In an eleventh embodiment, the present disclosure provides a moisture-curable composition according to any one of the first to tenth embodiments, wherein $R^5$ is selected from the group consisting of a carboxyl group, a sulfo group, formamido groups and a phosphono group.

In a twelfth embodiment, the present disclosure provides a moisture-curable composition according to any one of the first to tenth embodiments, wherein $R^5$ comprises a photocrosslinking group containing a benzophenone or substituted benzophenone moiety.

In a thirteenth embodiment, the present disclosure provides a method of making a composite article, the method comprising: disposing a layer of the moisture-curable composition of any one of the first to twelfth embodiments on a substrate, and at least partially curing the moisture-curable composition.

In a fourteenth embodiment, the present disclosure provides a composite article comprising a composition disposed on a substrate, wherein the composition comprises a cross-linked reaction product of components comprising the moisture-curable composition according to any one of the first to twelfth embodiments.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.
Materials:
Vinyltrimethoxysilane was obtained from TCI America, Portland, Oreg.
Triacetoxyvinylsilane was obtained from Alfa Aesar, Ward Hill, Mass.
Perfluoropropoxyisopropyl vinyl ether was made as described in U.S. Pat. No. 3,114,778 (Fritz et al.) where pentafluoropropionyl fluoride is reacted with two moles of hexafluoropropylene epoxide and dehalocarbonylated.

BP acrylate refers to 4-(2-acryloxyethoxy)benzophenone, which can be prepared as described in col. 11, lines 3-37 of U.S. Pat. No. 4,847,137 (Kellen et al.).

Other chemical materials used in the examples were obtained from, or are available from, chemical vendors such as, for example, Aldrich Chemical Co.

Measurement of Contact Angles

Contact angles reported in the examples were measured according to the following technique. The specimens for measuring the contact angles were prepared by coating the coating compositions on glass substrates according to the method described. Measurements were made using as received reagent-grade hexadecane and deionized water filtered through a filtration system (obtained from Millipore Corporation, Billerica, Mass.), and a video contact angle analyzer (available as product number DSA 100E from Kruss GmbH, Hamburg, Germany) Reported values are the average of measurements on at least three drops measured on the right and the left sides of the drops. Drops volumes were 1-5 microliters for advancing and receding contact angle measurements.

Ink Repellency Test

A line was drawn across the surface of a coated (i.e., with the coating to be tested) polycarbonate plaque using a Sharpie marker (available from Sanford, Bellwood, Ill.). The samples were visually rated for appearance and for the ability to repel a black Sharpie marker.

| Ink Repellency Test Ratings | |
|---|---|
| Ranking | Description |
| 1 | Ink beaded into discrete hemispherical droplets |
| 2 | Ink beaded into discrete elongated droplets |
| 3 | Ink line narrowed and discontinuous |
| 4 | Ink line continuous and not narrowed |

Preparation of Oligomeric Hexafluoropropylene Oxide (HFPO) 1300 MW Vinyl Ether ($C_3F_7O[CF(CF_3)CF_2O]_nCF=CF_2$, n=4-8)

A 3-liter three-necked round-bottom flask equipped with a mechanical stirrer and nitrogen bubbler was charged with 880 g, 0.68 mol, of oligomeric HFPO ester, $C_3F_7O[CF(CF_3)CF_2O]_nCF(CF_3)C(=O)OCH_3$, n=4-8 prepared as described in U.S. Pat. No. 3,322,826 (Moore) by taking the corresponding acid fluoride and reacting with excess methanol, 70 g of FLUORINERT FC-770 electronic fluid available from 3M Company and made into the sodium salt with the addition of 40 g, 1.0 mol, of sodium hydroxide dissolved in 400 g of water. The base solution was added over one hour and heated at a slight reflux for 20 hours. The mixture was placed in a glass tray and dried in a vacuum oven at 105° C./25 mm Hg (3.3 kPa) for 20 hours. To the dried oligomeric HFPO carboxylate salt was added 100 g of sodium carbonate split into two batches, followed by decarboxylation in a 1-liter round bottom flask by first pulling a 1 mm Hg (0.13 kPa) vacuum and heating up to distill the oligomeric HFPO vinyl ether to a head temperature of 200° C. under vacuum at 1 mm Hg (0.13 kPa). The two runs were combined to give 665 g of oligomeric vinyl ether $C_3F_7O—[CF(CF_3)CF_2O]_nCF=CF_2$, n=4-8 in 80% yield, and with a 1300 g/mol number average molecular weight.

Oligomeric Hexafluoropropylene Oxide (HFPO) 6000 MW Vinyl Ether $C_3F_7O[CF(CF_3)CF_2O]_nCF=CF_2$, n=30-40

A 1-liter three-necked round-bottom flask equipped with a mechanical stirrer and nitrogen bubbler was charged with 200 g, 0.03 mol, of oligomeric HFPO acid, $C_3F_7O[CF(CF_3)CF_2O]_nCF(CF_3)CO_2H$, n=30-40, available from E.I. du Pont de Nemours and Co., Wilmington, Del. as KRYTOX 157FSH, 200 g of FLUORINERT FC-770 electronic liquid from 3M Company, and the acid was converted into the sodium salt by the addition of 7 g, 0.33 mol, of sodium methoxide (25 weight percent in methanol). The base solution was added in five minutes and heated to a slight reflux for one hour, and the methanol and some FLUORINERT FC 770 was distilled off. The product mixture was placed in a glass tray and dried in a vacuum oven at 105° C./25 mm Hg (3.3 kPa) for 20 hours. To the dried oligomeric HFPO salt was added 25 g of sodium carbonate, followed by decarboxylation in a 1-liter round bottom flask by first pulling 1 mm Hg (0.13 kPa) vacuum and heating for one hour at a 250° C. pot temperature and 2 mm Hg (0.26 kPa) vacuum. A product cut of 52 g was collected in the receiver during decarboxylation of oligomeric vinyl ether $C_3F_7O[CF(CF_3)CF_2O]_nCF=CF_2$, n=20-30 having a 4300 g/mol number average molecular weight. From the reaction flask was recovered 92 g of oligomeric perfluoropolyether containing a mixture of vinyl ether, hydride and inert end groups.

Example 1

Vinyltrimethoxysilane (100 g), 5 g of HFPO vinyl ether ($M_n$=1300 g/mol), and 2.1 g of dicumyl peroxide were charged into a 250-ml Parr pressure reactor. The reactor was purged with nitrogen for 2 minutes, and then heated at 150° C. for 5 hours. A copolymer of vinyltrimethoxysilane and HFPO vinyl ether was obtained as a viscous liquid. The calculated average molar ratio of A to B was 175.

A coating solution was prepared by combining 0.2 g of the viscous liquid prepared above, 9.8 g of isopropanol, and 0.03 g of 5% aqueous HCl. Then, the solution was coated onto a glass slide using No. 12 Mayer rod (nominal wet thickness=1.08 mil (27.4 microns)). The coated slide was cured by heating at 120° C. for 10 minutes.

Example 2

Vinyltrimethoxysilane (100 g), 5 g of HFPO vinyl ether ($M_n$=1300 g/mol), 1 g of vinylphosphonic acid ($CH_2=CHPO_3H$), and 2.1 g of dicumyl peroxide were charged into a 250-ml Parr pressure reactor. The reactor was purged with nitrogen for 2 minutes, and then heated at 150° C. for 5 hours. A copolymer of vinyltrimethoxysilane, HFPO vinyl ether, and vinylphosphonic acid was obtained as a viscous liquid. The calculated average molar ratio of A to B was 175.

A coating solution was prepared by combining 0.2 g of the viscous liquid prepared above, 9.8 g of isopropanol, and 0.03 g of 5% aqueous HCl. Then, the solution was coated onto a glass slide using No. 12 Mayer rod (nominal wet thickness=1.08 mil (27.4 microns)). The coated slide was cured by heating at 120° C. for 10 minutes.

Example 3

Vinyltrimethoxysilane (100 g), 5 g of perfluoropropoxyisopropyl vinyl ether, and 2.1 g of dicumyl peroxide were charged into a 250-ml Parr pressure reactor. The reactor was purged with nitrogen for 2 minutes, and then heated at 150° C. for 5 hours. A copolymer of vinyltrimethoxysilane and perfluoropropoxyisopropyl vinyl ether was obtained as a viscous liquid. The calculated average molar ratio of A to B was 58.

A coating solution was prepared by combining 0.2 g of the viscous liquid prepared above, 9.8 g of isopropanol, and 0.03 g of 5% aqueous HCl. Then, the solution was coated onto a glass slide using No. 12 Mayer rod (nominal wet thickness=1.08 mil (27.4 microns)). The coated slide was cured by heating at 120° C. for 10 minutes.

Example 4

Vinyltrimethoxysilane (100 g), 5 g of HFPO vinyl ether ($M_n$=1300 g/mol), 2 g of BP acrylate, and 2.1 g of dicumyl peroxide were charged into a 250-ml Parr pressure reactor. The reactor was purged with nitrogen for 2 minutes, and then heated at 150° C. for 5 hours. A copolymer of vinyltrimethoxysilane, HFPO vinyl ether, and BP acrylate was obtained as a viscous liquid. The calculated average molar ratio of A to B was 175.

A coating solution was prepared by combining 0.2 g of the viscous liquid prepared above, 9.8 g of isopropanol, and 0.03 g of 5% aqueous HCl. Then, the solution was coated onto a glass slide using No. 12 Mayer rod (nominal wet thickness=1.08 mil (27.4 microns)). The coated slide was cured by heating at 120° C. for 10 minutes.

Examples 5A-5C

Triacetoxyvinylsilane (100 g), 5 g of HFPO vinyl ether ($M_n$=1300 g/mol), and 2.1 g of dicumyl peroxide were charged into a 250-ml Parr pressure reactor. The reactor was purged with nitrogen for 2 minutes, and then heated at 150° C. for 5 hours. A copolymer of triacetoxyvinylsilane and HFPO vinyl ether was obtained as a viscous liquid. The calculated average molar ratio of A to B was 112.

Three composite article specimens were prepared as follows:

Specimen 5A: A coating solution was prepared by combining 0.2 g of the viscous liquid prepared above and 9.8 g of methyl ethyl ketone. Then, the solution was coated onto a glass slide using No. 12 Mayer rod (nominal wet thickness=1.08 mil (27.4 microns)). The coated slide was cured by heating at 120° C. for 5 minutes.

Specimen 5B: A coating solution was prepared by combining 0.2 g of the viscous liquid prepared above, 9.8 g of isopropanol, and 0.03 g of 5% aqueous HCl. Then, the solution was coated onto a glass slide using No. 12 Mayer rod (nominal wet thickness=1.08 mil (27.4 microns)). The coated slide was cured by heating at 120° C. for 5 minutes.

Specimen 5C: A coating solution was prepared by combining 0.2 g of the viscous liquid prepared above and 9.8 g of methyl ethyl ketone. Then, the solution was coated onto a glass slide using No. 12 Mayer rod (nominal wet thickness=1.08 mil (27.4 microns)). The coated slide was cured overnight at room temperature.

Examples 6A-6B

Triacetoxyvinylsilane (100 g), 5 g of perfluoropropoxyisopropyl vinyl ether, and 2.1 g of dicumyl peroxide were charged into a 250-ml Parr pressure reactor. The reactor was purged with nitrogen for 2 minutes, and then heated at 150° C. for 5 hours. A copolymer of triacetoxyvinylsilane and perfluoropropoxyisopropyl vinyl ether was obtained as a viscous liquid. The calculated average molar ratio of A to B was 37.2.

Three coating solutions were prepared.

Solution 6A: A coating solution was prepared by combining 0.2 g of the viscous liquid prepared above and 9.8 g of methyl ethyl ketone. Then, the solution was coated onto a glass slide using No. 12 Mayer rod (nominal wet thickness=1.08 mil (27.4 microns)). The coated slide was cured by heating at 120° C. for 5 minutes.

Solution 6B: A coating solution was prepared by combining 0.2 g of the viscous liquid prepared above, 9.8 g of isopropanol, and 0.03 g of 5% aqueous HCl. Then, the solution was coated onto a glass slide using No. 12 Mayer rod (nominal wet thickness=1.08 mil (27.4 microns)). The coated slide was cured by heating at 120° C. for 5 minutes.

Solution 6C: A coating solution was prepared by combining 0.2 g of the viscous liquid prepared above and 9.8 g of methyl ethyl ketone. Then, the solution was coated onto a glass slide using No. 12 Mayer rod (nominal wet thickness=1.08 mil (27.4 microns)). The coated slide was cured overnight at room temperature.

Example 7

Vinyltrimethoxysilane (100 g), 5 g of HFPO vinyl ether ($M_n$=6100 g/mol), and 2.1 g of dicumyl peroxide were charged into a 250-ml Parr pressure reactor. The reactor was purged with nitrogen for 2 minutes, and then heated at 150° C. for 5 hours. A copolymer of vinyltrimethoxysilane and HFPO vinyl ether was obtained as a viscous liquid. The calculated average molar ratio of A to B was 823.

A coating solution was prepared by combining 0.2 g of the viscous liquid prepared above, 9.8 g of isopropanol, and 0.03 g of 5% aqueous HCl. Then, the solution was coated onto a glass slide using No. 12 Mayer rod (nominal wet thickness=1.08 mil (27.4 microns)). The coated slide was cured by heating at 120° C. for 10 minutes.

Results of testing of Examples 1-7 are presented in Table 1 (below).

TABLE 1

| EXAMPLE | $H_2O$ CONTACT ANGLE | | HEXADECANE CONTACT ANGLE | | INK REPELLENCY TEST RATING, 1-4 |
|---|---|---|---|---|---|
| | Advancing | Receding | Advancing | Receding | |
| 1 | 112.7 | 102.5 | 73.1 | 68.5 | 1 |
| 2 | 111.4 | 102.5 | 66.2 | 63.8 | 1 |
| 3 | 105.6 | 94.3 | 61.6 | 55.2 | 1 |
| 4 | 109.4 | 94 | 68.6 | 65.1 | 1 |
| 5A | 70 | 45 | 44.4 | 13.6 | 2 |
| 5B | 89.8 | 75.5 | 43.2 | 30.8 | 2 |
| 5C | 76.6 | 46.1 | 41.5 | 26.6 | 2 |
| 6A | 88 | 72.1 | 45.6 | 39.1 | 1 |
| 6B | 80.8 | 48.4 | 28.9 | 13.2 | 2 |
| 6C | 89.1 | 73.6 | 50.0 | 45.4 | 2 |
| 7 | 118.8 | 106.4 | 72.5 | 59.6 | 1 |

Example 8

Vinyltrimethoxysilane (30 g), 70 g of perfluoropropoxyisopropyl vinyl ether, 5 g of isocyanatoethyl methacrylate, and 2.1 g of dicumyl peroxide were charged into a 250-ml Parr pressure reactor. The reactor was purged with nitrogen for 2 minutes, and then heated at 150° C. for 8 hours. A copolymer of vinyltrimethoxysilane, perfluoropropoxyisopropyl vinyl ether, and isocyanatoethyl methacrylate was obtained as a viscous liquid. The calculated average molar ratio of A to B was 1.25.

Example 9

Vinyltrimethoxysilane (40 g), 55 g of perfluoropropoxyisopropyl vinyl ether, 5 g of glycidyl methacrylate, and 2.1 g of dicumyl peroxide were charged into a 250-ml Parr pressure reactor. The reactor was purged with nitrogen for 2 minutes, and then heated at 150° C. for 8 hours. A copolymer of vinyltrimethoxysilane, perfluoropropoxyisopropyl vinyl ether, and glycidyl methacrylate was obtained as a viscous liquid. The calculated average molar ratio of A to B was 2.12.

Example 10

Vinyltrimethoxysilane (40 g), 100 g of perfluoropropoxyisopropyl vinyl ether, 10 g of vinylidene chloride, and 2 g of dicumyl peroxide were charged into a 250-ml Parr pressure reactor. The reactor was purged with nitrogen for 2 minutes, and then heated at 150° C. for 8 hours. A copolymer of vinyltrimethoxysilane, perfluoropropoxyisopropyl vinyl ether, and vinylidene chloride was obtained as a viscous liquid. The calculated average molar ratio of A to B was 1.16.

Example 11

Vinyltrimethoxysilane (60 g), 82.5 g of perfluoropropoxyisopropyl vinyl ether, 7.5 g of acrylonitrile, and 3.15 g of dicumyl peroxide were charged into a 250-ml Parr pressure reactor. The reactor was purged with nitrogen for 2 minutes, and then heated at 150° C. for 15 hours. A copolymer of vinyltrimethoxysilane, perfluoropropoxyisopropyl vinyl ether, and acrylonitrile was obtained as a viscous liquid. The calculated average molar ratio of A to B was 2.12.

Example 12

Vinyltrimethoxysilane (90 g), 100 g of perfluoropropoxyisopropyl vinyl ether, 10 g of N-vinylformamide, and 4.2 g of dicumyl peroxide were charged into a 250-ml Parr pressure reactor. The reactor was purged with nitrogen for 2 minutes, and then heated at 120° C. for 15 hours. A copolymer of vinyltrimethoxysilane, perfluoropropoxyisopropyl vinyl ether, and N-vinylformamide was obtained as a viscous liquid. The calculated average molar ratio of A to B was 2.6.

Example 13

Vinyltrimethoxysilane (45 g), 50 g of perfluoropropoxyisopropyl vinyl ether, 5 g of acrylic acid, 100 g of ethyl acetate, and 2.2 g of dicumyl peroxide were charged into a 250-ml Parr pressure reactor. The reactor was purged with nitrogen for 2 minutes, and then heated at 150° C. for 15 hours. A copolymer of vinyltrimethoxysilane, perfluoropropoxyisopropyl vinyl ether, and acrylic acid was obtained as a viscous liquid. The calculated average molar ratio of A to B was 2.6.

Example 14

Vinyltrimethoxysilane (60 g), 100 g of perfluoropropoxyisopropyl vinyl ether, 40 g of isoprene, and 4.4 g of dicumyl peroxide were charged into a 250-ml Parr pressure reactor. The reactor was purged with nitrogen for 2 minutes, and then heated at 120° C. for 15 hours. A copolymer of vinyltrimethoxysilane, perfluoropropoxyisopropyl vinyl ether, and isoprene was obtained as a viscous liquid. The calculated average molar ratio of A to B was 1.79.

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A moisture-curable composition comprising a polymer prepared by free-radical copolymerization of monomers comprising at least one monomer A, at least one monomer B, and at least one monomer C, wherein:

each monomer A is independently represented by the formula

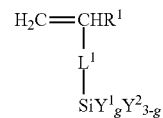

wherein
R$^1$ represents H or methyl,
L$^1$ is a covalent bond or a divalent aliphatic group having from 1 to 10 carbon atoms,
each Y$^1$ independently represents a hydrocarbyl group having from 1 to 6 carbon atoms,
each Y$^2$ independently represents a hydrolyzable group, and
g is 0, 1, or 2;

each monomer B is independently represented by the formula

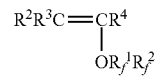

wherein
R$^2$, R$^3$, and R$^4$ represent H, methyl, trifluoromethyl, or F, wherein at least one of R$^2$, R$^3$, and R$^4$ is F,
R$_f^1$ represents a covalent bond or a divalent group selected from the group consisting of —(CF$_2$O)$_a$—, —(CF$_2$CF$_2$O)$_b$—, —(CF$_2$CF$_2$CF$_2$O)$_c$—, —(CF$_2$CF$_2$CF$_2$CF$_2$O)$_d$—, —(CF$_2$CF(CF$_3$)O)$_e$—, and combinations thereof, wherein a, b, c, d, and e represent integers in the range of from 0 to 130, and wherein 1≤a+b+c+d+e≤130,
R$_f^2$ is a perfluoroalkyl group; and
each C is independently represented by the formula

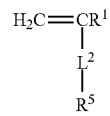

wherein
- $L^2$ represents a covalent bond or divalent aliphatic group comprising from 1 to 6 carbon atoms, and
- $R^5$ represents a photocrosslinking group containing a benzophenone or substituted benzophenone moiety, and further wherein the polymer contains less than or equal to 0.49 percent by weight of fluorinated alkene.

2. The moisture-curable composition of claim 1, wherein the weight ratio of said at least one monomeric unit B to said at least one monomeric unit A is at least 0.8.

3. The moisture-curable composition of claim 1, wherein $L^1$ is a covalent bond.

4. The moisture-curable composition of claim 1, wherein $Y^2$ is selected from the group consisting of alkoxy groups having from 1 to 4 carbon atoms, alkanoyloxy groups having from 2 to 4 carbon atoms, a hydroxyl group, and Cl.

5. The moisture-curable composition of claim 1, wherein said at least one monomer B has an average sum of a+b+c+d+e in the range of from 30 to 40.

6. The moisture-curable composition of claim 1, wherein said at least one monomer B has an average sum of a+b+c+d+e in the range of from 4 to 8.

7. A composite article comprising a composition disposed on a substrate, wherein the composition comprises a cross-linked reaction product of components comprising the moisture-curable composition of claim 1.

8. A moisture-curable composition comprising a polymer prepared by free-radical copolymerization of monomers comprising at least one monomer A, at least one monomer B, and at least one monomer C, wherein:

each monomer A is independently represented by the formula

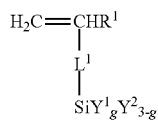

wherein
- $R^1$ represents H or methyl,
- $L^1$ is a covalent bond or a divalent aliphatic group having from 1 to 10 carbon atoms,
- each $Y^1$ independently represents a hydrocarbyl group having from 1 to 6 carbon atoms,
- each $Y^2$ independently represents a hydrolyzable group, and
- g is 0, 1, or 2;

each monomer B is independently represented by the formula

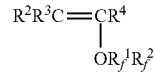

wherein
- $R^2$, $R^3$, and $R^4$ represent H, methyl, trifluoromethyl, or F, wherein at least one of $R^2$, $R^3$, and $R^4$ is F,
- $R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $2 \leq a+b+c+d+e \leq 130$, and
- $R_f^2$ is a perfluoroalkyl group; and each monomer C is independently represented by the formula

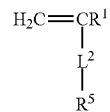

wherein
- $L^2$ represents a covalent bond or divalent aliphatic group comprising from 1 to 6 carbon atoms, and
- $R^5$ represents a photocrosslinking group containing a benzophenone or substituted benzophenone moiety.

9. The moisture-curable composition of claim 8, wherein the weight ratio of said at least one monomeric unit B to said at least one monomeric unit A is at least 0.8.

10. The moisture-curable composition of claim 8, wherein $L^1$ is a covalent bond.

11. The moisture-curable composition of claim 8, wherein $Y^2$ is selected from the group consisting of alkoxy groups having from 1 to 4 carbon atoms, alkanoyloxy groups having from 2 to 4 carbon atoms, a hydroxyl group, and Cl.

12. The moisture-curable composition of claim 8, wherein said at least one monomer B has an average sum of a+b+c+d+e in the range of from 30 to 40.

13. The moisture-curable composition of claim 8, wherein said at least one monomer B has an average sum of a+b+c+d+e in the range of from 4 to 8.

14. A composite article comprising a composition disposed on a substrate, wherein the composition comprises a cross-linked reaction product of components comprising the moisture-curable composition of claim 8.

* * * * *

UNITED STATES PATENT AND TRADEMARK OFFICE
CERTIFICATE OF CORRECTION

| | | |
|---|---|---|
| PATENT NO. | : 9,725,546 B2 | Page 1 of 1 |
| APPLICATION NO. | : 14/901261 | |
| DATED | : August 8, 2017 | |
| INVENTOR(S) | : Yu Yang | |

It is certified that error appears in the above-identified patent and that said Letters Patent is hereby corrected as shown below:

On the Title Page

Column 2 (Primary Examiner)
Line 1, Delete "Vu A Nuyen" and insert -- Vu A Nguyen --, therefor.

In the Specification

Column 1
Line 61 (Approx.), Delete "—(CF$_2$CF(CF$_3$)$_e$—," and insert -- —(CF$_2$CF(CF$_3$)O)$_e$—, --, therefor.

Column 4
Line 53, Delete "for 1" and insert -- 1 --, therefor.

Column 11
Line 20, Delete "Germany)" and insert -- Germany). --, therefor.

Signed and Sealed this
Tenth Day of April, 2018

Andrei Iancu
*Director of the United States Patent and Trademark Office*